United States Patent
Behr et al.

(10) Patent No.: US 10,787,989 B2
(45) Date of Patent: Sep. 29, 2020

(54) ENGINE BLOCK FOR AN INTERNAL COMBUSTION ENGINE OF A MOTOR VEHICLE AND METHOD OF MANUFACTURING AN ENGINE BLOCK FOR AN INTERNAL COMBUSTION ENGINE OF A MOTOR VEHICLE

(71) Applicant: Daimler AG, Stuttgart (DE)

(72) Inventors: Thomas Behr, Elchingen (DE); Klaus Geiger, Kuchen (DE); Udo Grimmer, Ulm (DE); Tobias Hanschke, Westerstetten (DE); Martin Hartweg, Erbach (DE); Volker Lagemann, Ulm (DE); Harald Scheib, Blaustein (DE); Sebastian Schiefer, Ulm (DE); Martin Stroeer, Immenstaad (DE); Silvia Tomaschko, Ulm (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/349,890

(22) PCT Filed: Oct. 6, 2017

(86) PCT No.: PCT/EP2017/001182
§ 371 (c)(1),
(2) Date: May 14, 2019

(87) PCT Pub. No.: WO2018/091121
PCT Pub. Date: May 24, 2018

(65) Prior Publication Data
US 2020/0063686 A1    Feb. 27, 2020

(30) Foreign Application Priority Data

Nov. 15, 2016 (DE) .................. 10 2016 013 603

(51) Int. Cl.
*F02F 1/18* (2006.01)
*F02F 3/00* (2006.01)
*F16J 10/00* (2006.01)

(52) U.S. Cl.
CPC .................. *F02F 1/18* (2013.01); *F02F 3/00* (2013.01); *F16J 10/00* (2013.01); *F02F 2200/00* (2013.01)

(58) Field of Classification Search
CPC .. F02F 1/18; F02F 3/00; F02F 2200/00; F16J 10/00
See application file for complete search history.

(56) References Cited

U.S. PATENT DOCUMENTS

2010/0105292 A1* 4/2010 Nagel ..................... B24B 33/02
451/8

FOREIGN PATENT DOCUMENTS

DE    10 2008 026 146 B4    12/2009
DE    10 2009 024 227 B4    1/2010
(Continued)

OTHER PUBLICATIONS

PCT/EP2017/001182, International Search Report dated Jan. 16, 2018 (Two (2) pages).
(Continued)

*Primary Examiner* — Jacob M Amick
*Assistant Examiner* — Charles Brauch
(74) *Attorney, Agent, or Firm* — Crowell & Moring LLP

(57) ABSTRACT

An engine block for an internal combustion engine of a motor vehicle has a cylinder within which a piston can be movably accommodated between a top dead center and a bottom dead center and has a cylinder bore, the internal cylinder diameter of which expands in the direction of the bottom dead center. The internal cylinder diameter expands only below the region in which a piston system change takes (Continued)

place during operation of the internal combustion engine. The internal cylinder diameter tapers from the top dead center to the region.

5 Claims, 1 Drawing Sheet

(56) References Cited

FOREIGN PATENT DOCUMENTS

| | | | |
|---|---|---|---|
| DE | 10 2011 117 660 B4 | 5/2013 | |
| FR | 2 457 744 A1 | 12/1980 | |
| FR | 2743605 A1 * | 7/1997 | ............. F02B 75/16 |
| JP | 2000-282949 A | 10/2000 | |
| JP | 2000282949 A * | 10/2000 | |
| JP | 2013-113275 A | 6/2013 | |

OTHER PUBLICATIONS

Japanese-language Japanese Office Action issued in Japanese application No. 2019-519238 dated Mar. 3, 2020 (Three (3) pages).

* cited by examiner

ENGINE BLOCK FOR AN INTERNAL COMBUSTION ENGINE OF A MOTOR VEHICLE AND METHOD OF MANUFACTURING AN ENGINE BLOCK FOR AN INTERNAL COMBUSTION ENGINE OF A MOTOR VEHICLE

BACKGROUND AND SUMMARY OF THE INVENTION

The invention relates to an engine block for an internal combustion engine of a motor vehicle and a method for producing an engine block for an internal combustion engine of a motor vehicle.

Cylinders in engine blocks for combustion engines usually have a cylindrical shape when finished. Such engine blocks are often referred to as crankcases. Due to the design of such crankcases, a necessary tightening of cylinder head bolts, different thermal expansions in fired operation and cylinder pressures occurring during combustion, however, there are sometimes significant deviations from an ideal cylinder shape, which is associated with friction losses and consequently also with consumption disadvantages.

It is already known that in the manufacture of cylinders in engine blocks for internal combustion engines, there are also deviations from a strictly cylindrical shape. For example, DE 10 2008 026 146 B4 shows a cylinder that first widens slightly from a top dead center and then narrows again in the direction of the bottom dead center. In other words, the cylinder shown there has a bulbous shape.

The DE 10 2011 117 660 B4 also features a cylinder that deviates from a strictly cylindrical shape. The cylinder is divided into two cylinder space sections, between which, seen in axial direction, there is a transition section. The two cylinder space sections have different diameters.

Finally, DE 10 2009 024 227 B4 shows a generic engine block for an internal combustion engine of a motor vehicle, having at least one cylinder, within which a piston can be accommodated movably between a top dead center and a bottom dead center, and having a cylinder raceway, the inner cylinder diameter of which widens in the direction of the bottom dead center.

The object of the present invention is to provide an engine block for an internal combustion engine of a motor vehicle and a method for manufacturing such an engine block, by means of which friction and noise optimized operation of the internal combustion engine is promoted.

In order to enable an internal combustion engine to operate in a manner optimized in terms of frictional power and noise, the inventive engine block provides that the internal cylinder diameter only widens below the region in which a change in piston stroke takes place during operation of the internal combustion engine, the internal cylinder diameter tapering from top dead center to the region in which a change in piston stroke takes place during operation of the internal combustion engine. This means that the geometry is optimized for noise and friction with regard to the diameter of the cylinder bore. This allows the friction between the piston and the cylinder bore to be reduced during operation of the combustion engine, which also results in a particularly favorable noise behavior of the combustion engine. The partial expansion of the cylinder inner diameter of the cylinder bore only below the area in which a change in piston stroke occurs during operation of the combustion engine means that the piston clearance of the piston can be optimally designed with regard to undesirable noise development. Below the change in piston stroke, the friction power can also be minimized by increasing the clearance and by avoiding overlapping conditions.

By means of the engine block according to the invention, considerable consumption advantages can be achieved, so that a substantial contribution to the achievement of $CO_2$ fleet goals is favored. In particular, the engine block in accordance with the invention also meets the usually very high customer requirements with regard to engine noise.

An advantageous embodiment of the invention is that the inner diameter of the cylinder expands to the bottom dead center of the piston. This enables particularly noise-optimized and consumption-optimized operation of the combustion engine.

Another advantageous embodiment of the invention is that the inner diameter of the cylinder expands to a conical shape. In other words, the inside diameter of the cylinder expands linearly. This is particularly cost-effective and easy to achieve in terms of manufacturing technology.

In the method according to the invention for producing an engine block for an internal combustion engine of a motor vehicle with at least one cylinder, within which a piston can be movably accommodated between a top dead center and a bottom dead center, a cylinder raceway is machined in such a way that its inner cylinder diameter widens in the direction of the bottom dead center. The invention provides that the widening inner cylinder diameter is produced only below the region in which a change in piston stroke takes place during operation of the internal combustion engine, the inner cylinder diameter being produced tapering from the top dead center to the region. The invention provides that the inner cylinder diameter is produced tapering from the top dead center to the region. The invention also provides that the inner cylinder diameter is produced tapering from the top dead center to the region. Advantageous designs of the engine block in accordance to the invention are to be regarded as advantageous designs of the process in accordance to the invention.

The expanding inner diameter of the cylinder is preferably produced by honing. This allows the expanding cylinder inner diameter to be produced in a particularly precise manner.

Further advantages, features and details of the invention result from the following description of a preferred execution example as well as from the drawing. The features and combinations of features mentioned above in the description as well as the features and combinations of features mentioned below in the figure description can be used not only in combination with each other but also in a unique position without leaving the scope of the invention.

DETAILED DESCRIPTION OF THE DRAWINGS

In the figures, identical or functionally identical elements are provided with identical reference signs.

Figure 1:
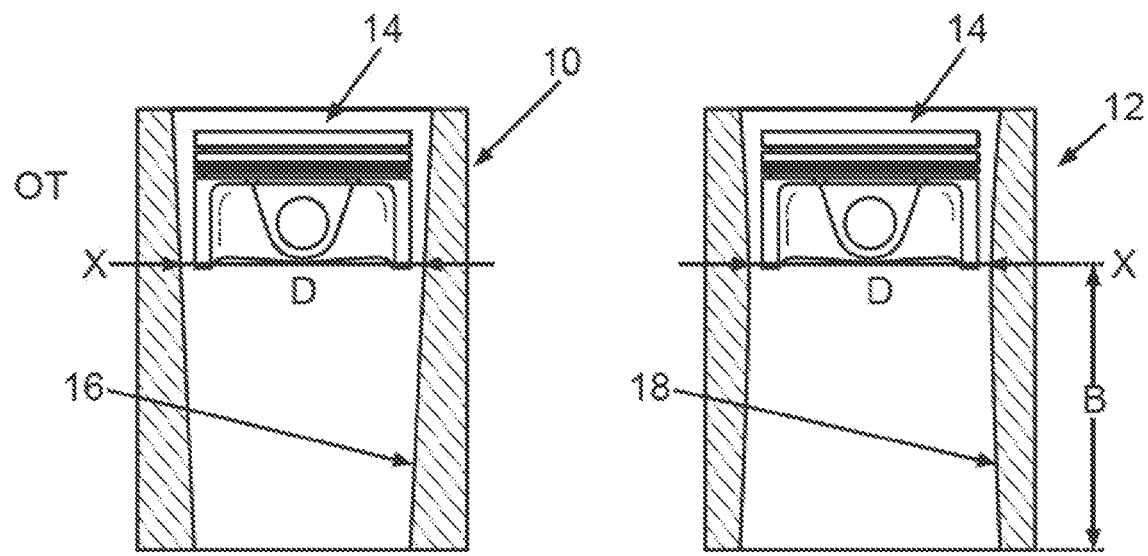
FIG. 1 is a side cross section of two different cylinders of an engine block, wherein a respective piston is at top dead center.

Two different cylinders 10, 12, which are each part of respective combustion engines not shown in detail, are shown in a cut side view in FIG. 1. The respective pistons 14 are arranged in FIG. 1 in their top dead center OT. The cylinders 10, 12 are both shown in the heated state, which they reach after a certain duration in the fired operation of the respective combustion engines. The shape of the cylinders 10, 12 shown here corresponds to that of the cylinders 10, 12 when they reach their usual operating temperature during operation of the respective combustion engines.

The two cylinders 10, 12 differ with respect to the geometry of the respective cylinder bores 16, 18. In the heated state shown here, the diameter D of the cylinder bore 16 of the left cylinder 10 decreases in the direction of a bottom dead center UT of the piston 14. The cylinder bore 16 therefore tapers downwards in accordance with the present diagram. In the cold state, however, the diameter D of the cylinder bore 16 of the left cylinder 10 is constant, i.e., it does not change in the axial direction of the cylinder bore 16.

In the heated state shown here, the diameter D of the cylinder bore 18 of the right of the two cylinders 12 also changes in the axial direction of the cylinder 12. However, the diameter D of the cylinder bore 18 widens below an area X in which a change in piston stroke of the piston 14 takes place during operation of the combustion engine. Starting from area X, the diameter D of the cylinder bore 18 widens conically in the direction of the bottom dead center UT of the piston 14, with the diameter D of the cylinder bore tapered from top dead center OT to area X. The diameter D of the cylinder bore 18 widens in the direction of the bottom dead center UT of the piston 14.

This form of the cylinder bore 18, which widens in an area B, is achieved by not producing the cylinder bore 18 with a constant diameter D. The cylinder bore 18 is not produced with a constant diameter D. Instead, the cylinder bore 18 is produced in such a way that it expands in the cold state in area B, i.e., the diameter D increases from area X of the change in piston stroke to the bottom dead center UT. The degree of diameter enlargement in the cold state of cylinder 12 is selected so that cylinder 12 has a trumpet-like widening shape in the direction of the bottom dead center UT even at operating temperature. In contrast to the left cylinder 10, the cylinder bore 18 of the right cylinder 12 does not taper in the direction of the bottom dead center UT when heated, but instead widens in the direction of the bottom dead center UT when heated.

Figure 2:
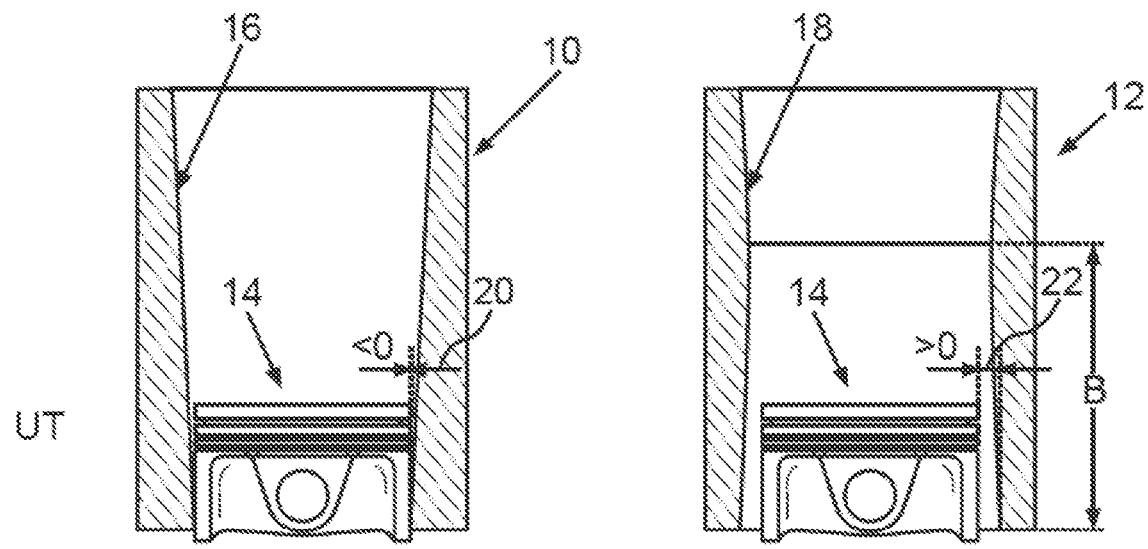
FIG. 2 is a further side cross section of the two cylinders, wherein the respective pistons are at bottom dead center.

FIG. 2 shows the two pistons 14 guided in the respective cylinders 10, 12 in their respective bottom dead centers UT. Again, the two cylinders 10, 12 are shown in the heated state, which they reach after a certain operating time of the respective combustion engines. As already explained, the left of the two cylinders 10 has a cylindrical shape in the cold state with a constant diameter D of the cylinder bore 16, whereas the right of the two cylinders 12 in the cold state expands the cylinder bore 18 in the area B in the direction of the bottom dead center UT.

Due to the completely cylindrical shape of the cylinder bore 16 in the cold state and other factors, such as the required tightening of cylinder head bolts, different thermal expansions of the cylinder 10 in fired operation and pressures occurring inside the cylinder 10 during combustion, there are, as can be seen in FIGS. 1 and 2, significant deviations from the ideal cylinder shape which the cylinder bore 16 has in the cold state.

In the case of the left of the two cylinders 10, the problem arises in the heated state shown here that the piston 14 in the fired state has an overlap 20 with the cylinder bore 16 due to the diameter D decreasing in the direction of the bottom dead center UT. In the vicinity of the bottom dead center UT, the piston diameter is larger than the diameter D of the cylinder bore 16. The piston 14 therefore touches the cylinder bore 16 during the up and down movement between the top dead center OT and the bottom dead center UT. As a result, friction losses occur and unwanted noises develop.

In the case of the right cylinder 12, on the other hand, wherein the diameter D of the cylinder bore 18—both in the cold and in the heated state—expands successively in region B in the direction of the bottom dead center UT in region B, there is a certain piston clearance of piston 14 in the radial direction in the entire region B. In the case of the right cylinder 12, on the other hand, the diameter D of the cylinder bore 18 expands in the direction of the bottom dead center UT in the same direction as in the cold state. This has a positive effect on noise development and friction losses, which can therefore be minimized.

Due to the trumpet-shaped diameter expansion of the cylinder bore 18 in area B, a certain distance 22 is always maintained between the cylinder bore 18 and the piston 14 in the radial direction. Due to the expansion of the cylinder bore 18 in the direction of the bottom dead center UT, a radial increase in play is achieved between the piston 14 and the cylinder bore 18. This means that overlapping conditions between the piston 14 and the cylinder bore 18 can be ruled out. As a result, considerable consumption and acoustic advantages can be achieved.

The invention claimed is:

1. An engine block for an internal combustion engine of a motor vehicle, comprising:
   a piston;
   a cylinder within which the piston is movably accommodated between a top dead center and a bottom dead center;
   wherein the cylinder has a bore and wherein an inner diameter of the bore widens in a direction of the bottom dead center;
   wherein the inner diameter only widens below a region in which a change in piston stroke takes place during operation of the internal combustion engine such that below the region a distance is always maintained between the cylinder bore and the piston in a radial direction and wherein the inner diameter tapers from the top dead center to the region.

2. The engine block according to claim 1, wherein the inner diameter widens to the bottom dead center.

3. The engine block according to claim 1, wherein the inner diameter widens conically.

4. A method for producing the engine block according to claim 1, comprising the step of:
   machining the bore of the cylinder.

5. The method according to claim 4, wherein the widened inner diameter is produced by honing.

\* \* \* \* \*